April 13, 1965
J. B. MADDALONI
3,178,317
DRY CELL POWER SUPPLY
Filed Sept. 26, 1962
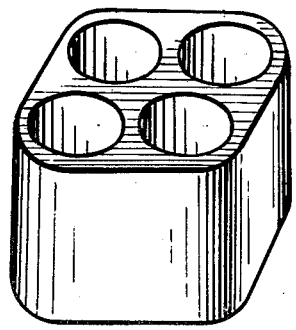
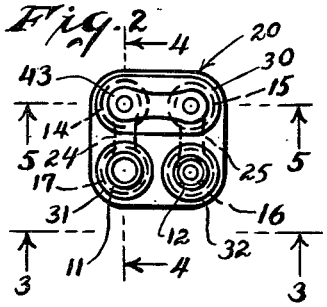
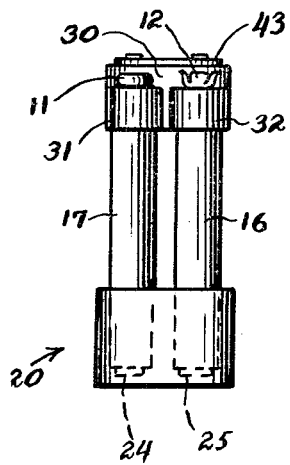
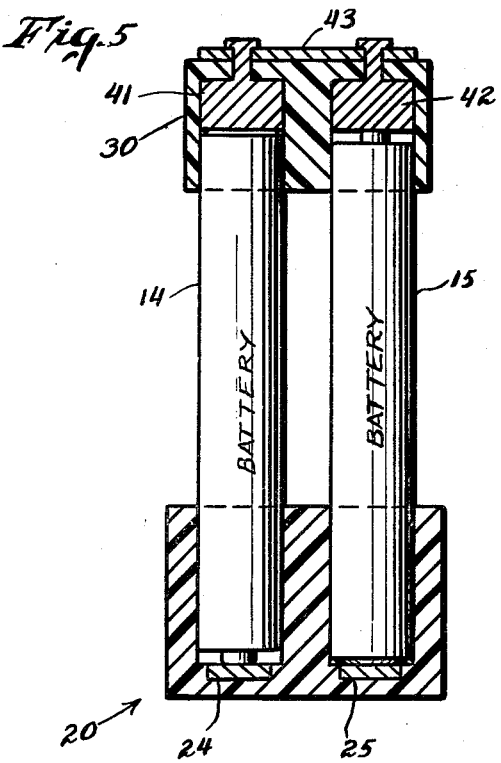
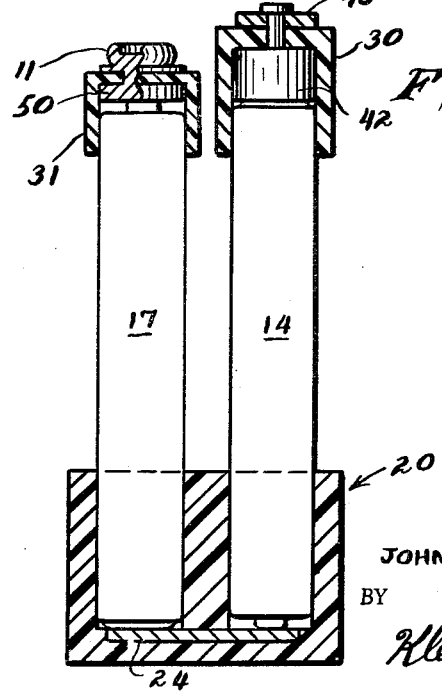
INVENTOR.
JOHN BAPTIST MADDALONI
BY
Kleinberg & Lilling
ATTORNEYS

United States Patent Office 3,178,317
Patented Apr. 13, 1965

3,178,317
DRY CELL POWER SUPPLY
John Baptist Maddaloni, 86—34 144th St.,
Jamaica, Queens, N.Y.
Filed Sept. 26, 1962, Ser. No. 226,351
1 Claim. (Cl. 136—173)

This invention relates generally to the field of portable radios; more specifically, it presents a new and improved power supply; and in detail, it is concerned with a multi-dry cell battery for portable radios or the like.

While dry cells for use in conjunction with portable radios or other applicances are well known, their construction has complicated their use. Many of the conventional portable radios utilize a single power supply. This battery suffers from several major disadvantages. For one thing, such a battery is relatively expensive. Furthermore, a single defect at almost any portion of this battery often destroys the effectiveness of the entire unit.

It is a cardinal object of this invention, therefore, to provide a more economical power supply source for conventional portable radios or other appliances.

It is another primary object of this device to describe a dry cell power supply for portable radios or other appliances that will be longer lasting.

It is another object and accomplishment of the instant invention to provide a plurality of relatively cheap and efficient small flashlight batteries coupled together to form a single power supply output for use in portable accessories.

A further object hereof is to describe an efficient and durable method of fastening and connecting electrically a plurality of relatively small dry cells.

An ancillary object of the instant invention is to provide a relatively foolproof method of electrically connecting a wire to the terminals of dry cell batteries.

With these objects in view, the invention consists of the novel features of construction and arrangement of parts which will appear in the following specification and recited in the appended claim, reference being had to the accompanying drawings in which the same reference numerals indicate the same parts throughout the various figures and in which:

FIG. 1 is a view in perspective of the lower battery retaining case.

FIG. 2 is a top plan view of the assembled battery unit.

FIG. 3 is a side elevational view taken substantially along line 3—3 of FIG. 2.

FIG. 4 is an elevational view taken substantially along line 4—4 of FIG. 2 on an enlarged scale.

FIG. 5 is a view taken substantially along line 5—5 of FIG. 2 on an enlarged scale.

Referring to the drawings, which illustrate what may be for some purposes a preferred embodiment of the invention, I have illustrated generally the electrical terminals 11 and 12 which may be connected to a portable radio or the like.

In the exemplary embodiment of the invention depicted, there is shown a plurality of individual dry cell batteries, 14, 15, 16 and 17. It is contemplated that the batteries 14, 15, 16 and 17 will be disposed in parallel juxtaposition within the casing as of a portable radio.

There is shown in the drawings, an embodiment of the instant invention wherein four miniature batteries may be physically and electrically joined together in such manner as to replace a single larger voltage battery in any conventional radio, portable appliance, toy, or the like.

As seen in FIG. 1, the device will include a lower battery case 20 to receive, locate and electrically join the four batteries 14, 15, 16 and 17. The battery case 20 may take any well known form but will have internal clearance to receive four batteries and to electrically connect them in pairs.

Thus, as shown in FIGS. 4 and 5, pairs of batteries will be electrically connected by a pair of electrical conductors 24 and 25 located internally of the battery case 20. Thus, batteries 14 and 17 will be electrically connected and batteries 15 and 16 will be electrically connected.

The battery case 20 may cover only a fractional area of the length of each of the batteries (as illustrated) or may cover a substantially greater portion thereof.

Located at the end of the batteries opposite case 20 will be a double cap 30 and a pair of end electrical terminal caps 31 and 32.

Referring to FIG. 3, the doubled cap 30 will slip over the pair of batteries 14 and 15 in an intimate manner. As shown in FIG. 5, the internal portion of the said cap 30 will have a pair of electrical contacts 41 and 42 electrically connected as by a conducting spacer bar 43. This will serve to electrically join the terminals of batteries 14 and 15.

Terminal cap 31 will be capable of being urged over one of the batteries 17 and will have an electrical internal contact 50 electrically communicating with the said battery 17. The said electrical contact 50 will be connected through the cap to an external quick-disconnected coupling 11 (hereinafter shown as the well known male type). The other electrical terminal 32 may be urged over the adjoining battery 16 and similarly will have an electrical connection therefrom to an external female type connector 12.

If desired, the caps 31 and 32 may be physically joined and fabricated as one integral assembly, instead of the double assembly, as illustrated.

Thus, it will be seen that four individual batteries may be electrically and physically joined in the invention described above to replace one single larger battery. Batteries, 14 and 17 are electrically connected by conducting bar 24 in the casing 20. Batteries 14 and 15 are electrically connected by the conducting bar 43 above the double cap 30. Batteries 15 and 16 are electrically connected by the conducting bar 25 in the casing 20. A conventional radio or appliance electrical mounting plate may, of course, be snapped over caps 30 and 31 thereby allowing the unit to provide current for any desired purpose. It is important for proper operation of the assembly that the batteries 14, 15, 16 and 17 be alternately reversed to provide a series flow of current. Thus, battery 14 will have its positive terminal downward, battery 15 will have its positive terminal upward, battery 16 will have its positive terminal downwards and battery 17 will have its positive terminal upwards. This arrangement will serve to electrically add the voltage output of the individual batteries.

The embodiment of the invention described above will serve to eliminate any electrical drainage or leakage and will positively secure the batteries together in an efficient and dependable manner.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claim as are stated therein, or required by the prior art.

Having thus described my invention, and illustrated its use, what I claim as new and desire to secure by Letters Patent is:

A power supply pack, comprising, a first, a second, a third and a fourth dry cell battery, each of said batteries having a positive and a negative terminal positioned at opposite longitudinal ends thereof, and case means for retaining said batteries in parallel juxtaposition, said case means having first electrical contact means to connect the negative terminal of said first battery to the positive terminal of said fourth battery, and the negative terminal of said third battery to the positive terminal of said second battery, said case means further having second electrical contact means to connect the negative terminal of said fourth battery to the positive terminal of said third battery, said positive terminal of said first battery and said negative terminal of said second battery having end electrical terminal caps whereby they may be electrically connected for power supply, said case means further being comprised of a first portion, and a second portion, said first portion including said first electrical contact means and retaining one end of each of said batteries, and said second portion including said second electrical contact means retaining said other end of each of said batteries, whereby said first and said second portions may be separated for replacement of said batteries, said second portion of said case means being comprised of a double cap portion attached to said negative terminal of said fourth dry cell battery and said positive terminal of said third dry cell battery, and separable terminal caps surrounding said positive terminal of said first battery and said negative terminal of said second battery.

References Cited by the Examiner

UNITED STATES PATENTS

| | | | |
|---|---|---|---|
| 1,316,568 | 9/19 | Koretzky. | |
| 2,383,337 | 8/45 | Moxley. | |
| 3,085,127 | 4/63 | Loris | 136—173 |
| 3,110,634 | 11/63 | Bradshaw | 136—173 |

JOHN H. MACK, *Primary Examiner.*